June 29, 1965   A. P. BRIETZKE   3,191,762
SCREW-TYPE CONVEYOR SYSTEM
Filed April 11, 1963   5 Sheets-Sheet 1
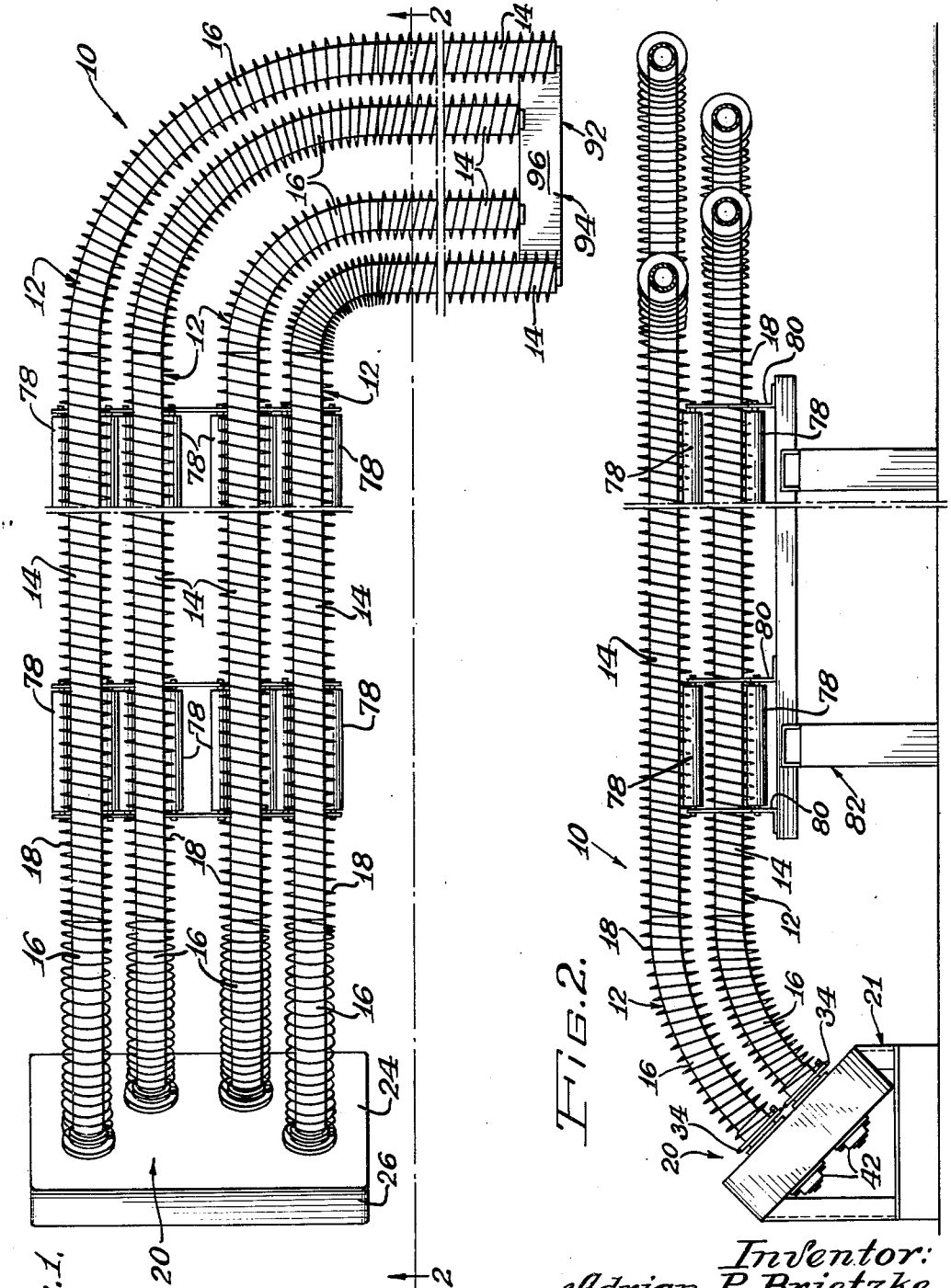
Inventor:
Adrian P. Brietzke
By Bair, Freeman & Molinare
Attys.

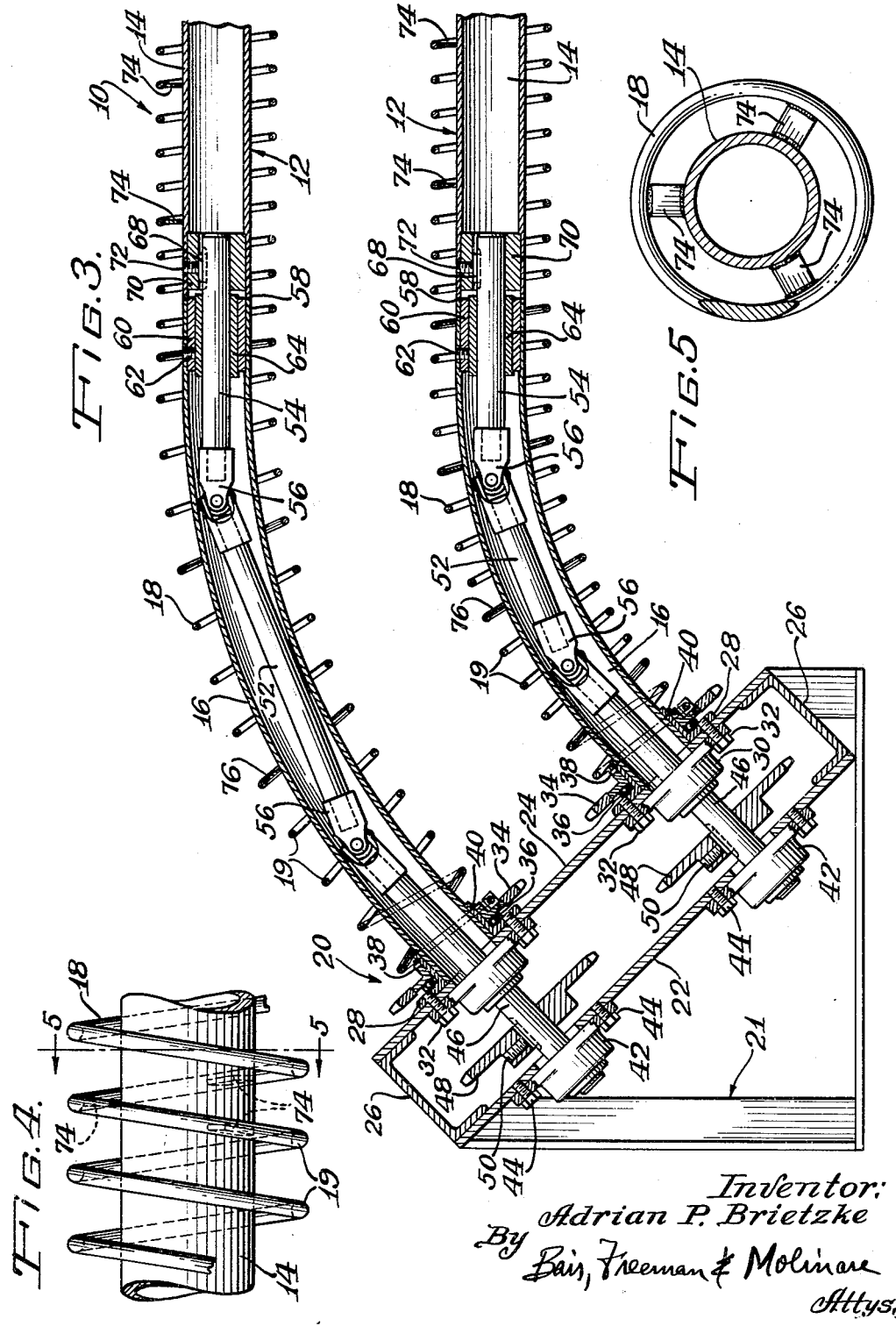

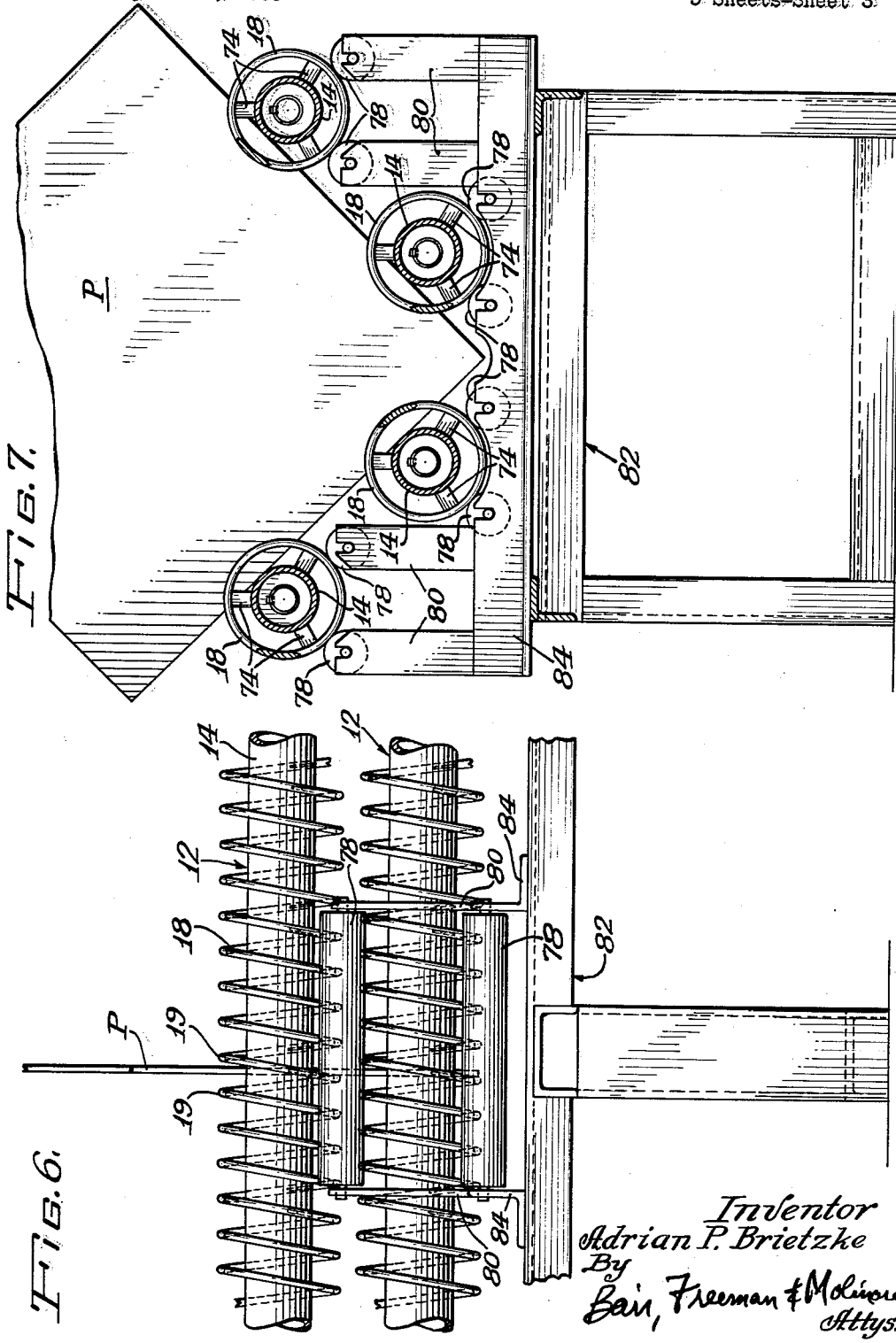

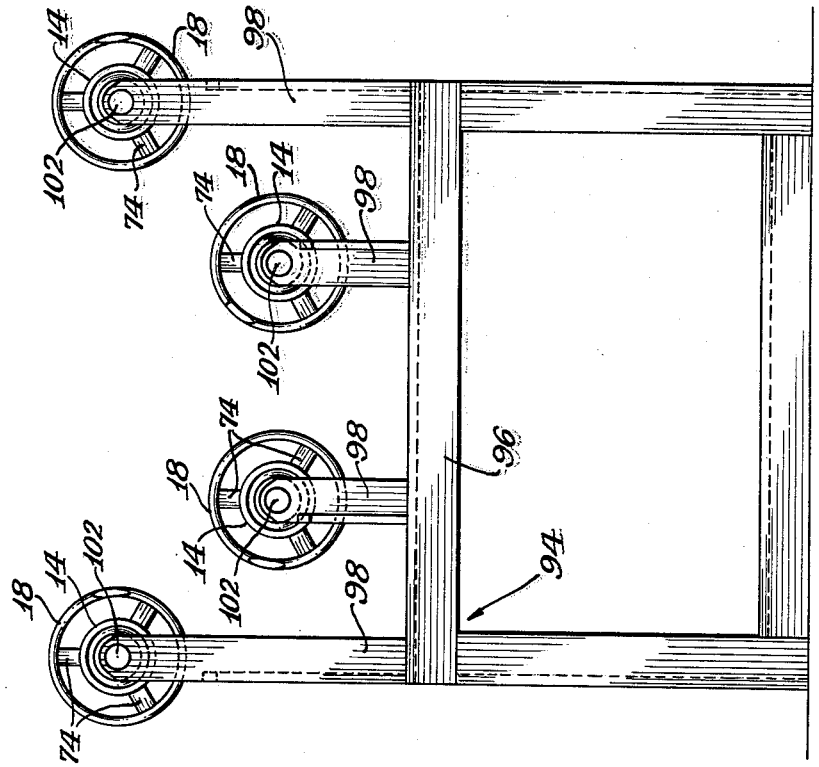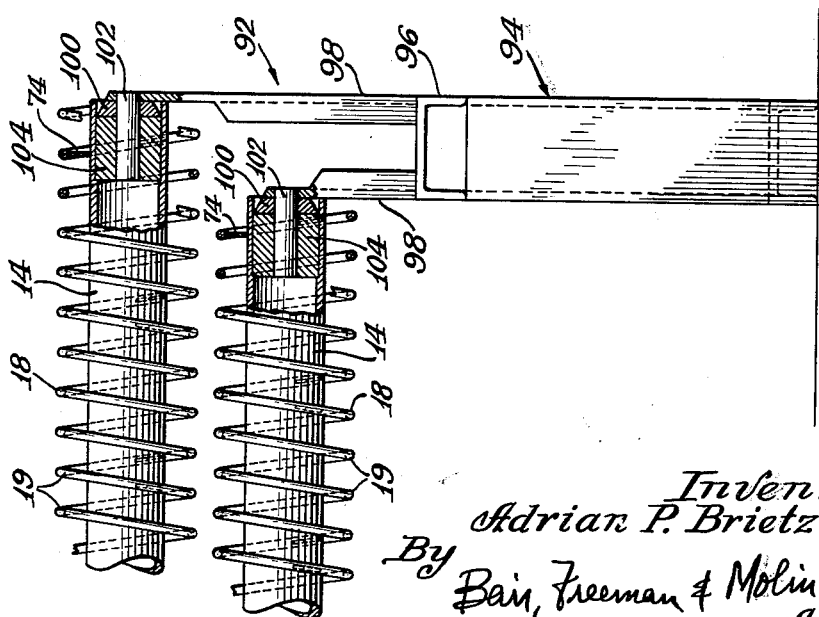

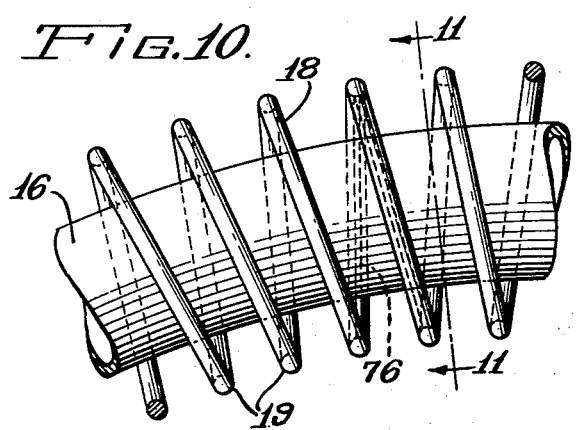
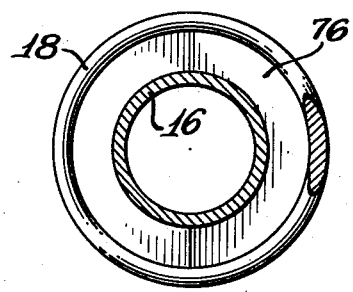
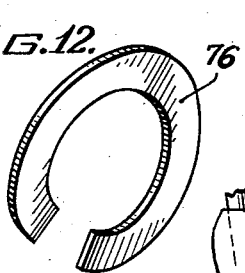
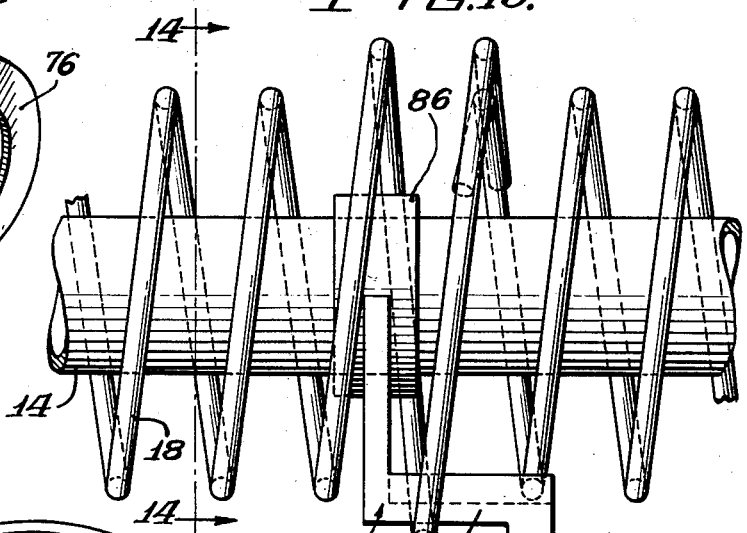
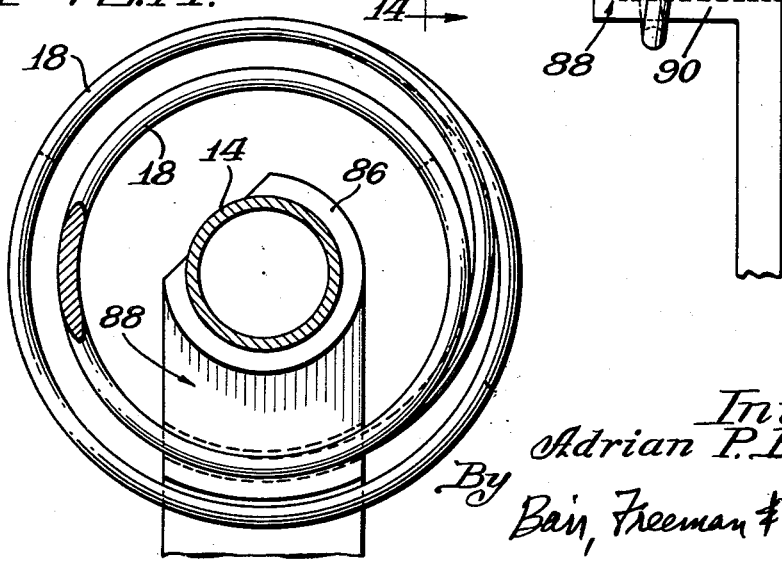

3,191,762
SCREW-TYPE CONVEYOR SYSTEM
Adrian P. Brietzke, La Crosse, Wis., assignor to Northern Engraving and Manufacturing Company, a corporation of Wisconsin
Filed Apr. 11, 1963, Ser. No. 272,473
6 Claims. (Cl. 198—213)

This invention relates to improved conveyor systems and it particularly relates to an improved conveyor which is adapted to transfer planar objects along a path of travel in a generally endwise position.

In many manufacturing processes, it is necessary to convey substantially flat or planar objects, which have been painted or otherwise coated on one or both surfaces, without smearing the coated or painted surfaces. Present systems used for conveying such painted or coated objects include the use of racks, cases, wicket conveyors, etc. However, most of these systems are quite cumbersome and ordinarily contact and smear at least a portion of the object. Further, present conveying systems actually move along with the objects through the heating or cooling areas and therefore must also be heated or cooled. Thus, in heating and cooling the conveyor equipment, which often is larger than the objects being treated, there is a great loss of heating and/or cooling capacity of the treating equipment. An additional serious disadvantage of these conveying systems is that they are often quite expensive to construct and maintain. Still further, many of the known systems are not flexible since they are not readily adaptable for conveying objects around curves in horizontal or vertical directions.

Therefore, it is an important object of this invention to provide a conveyor useful for transferring planar objects in a substantially endwise position so as to avoid smearing of painted or coated surfaces.

It is a further object of this invention to provide a conveyor useful for transferring planar objects in both a straight path of travel and in a curved path of travel for changing the direction of travel of the planar objects.

It is also an object of this invention to provide a conveyor wherein the mass of the conveyor does not continually move through heating and/or cooling areas.

It is another object of this invention to provide a conveyor for advancing planar objects along a path of travel wherein the objects may be readily loaded on and discharged from the conveyor.

It is an additional object of this invention to provide a conveyor which is characterized by its simplicity and economy of construction.

Further purposes and objects of this invention will appear as the specification proceeds.

A particular embodiment of the present invention is illustrated in the accompanying drawings, wherein:

FIGURE 1 is a top plan view of my conveyor;
FIGURE 2 is a sectional view taken along the line 2—2 of FIGURE 1;
FIGURE 3 is an enlarged longitudinal sectional view showing a curved portion of my conveyor at the entrance end and also showing the drive means for the conveyor;
FIGURE 4 is an enlarged fragmentary view of a portion of my conveyor;
FIGURE 5 is a sectional view taken along the line 5—5 of FIGURE 4;
FIGURE 6 is a fragmentary, side elevational view of the conveyor, particularly illustrating support means for the conveyor;
FIGURE 7 is an end elevational view of the embodiment of FIGURE 6;
FIGURE 8 is a fragmentary, side elevational view, partially in section, of the exit end of the conveyor;
FIGURE 9 is an end elevational view of the embodiment of FIGURE 8;
FIGURE 10 is an enlarged, fragmentary view of a curved portion of my conveyor;
FIGURE 11 is a sectional view taken along the line 11—11 of FIGURE 10;
FIGURE 12 is a perspective view of a spacer used to separate the rotating spirals from the fixed curved portions of the conveyor shafts;
FIGURE 13 is an enlarged, fragmentary side elevational view of an alternate embodiment of means for supporting the conveyor; and
FIGURE 14 is a sectional view taken along the line 14—14 of FIGURE 13.

Referring particularly to FIGURES 1 and 2, my improved conveyor 10 includes a plurality of shafts, generally 12, having straight portions 14 and hollow curved portions 16. The shafts 12 are so positioned, relative to each other, that substantially planar objects P may be conveyed in a substantially endwise position. In the conveyor shown, the two upper shafts 12 and two lower shafts 12 are provided, the lower shafts being placed closed together than the upper shafts, so that substantially square or rectangular objects P are supported by the shafts 12, as seen in FIGURE 7. It is to be understood that the particular arrangement of the shafts 12 is dependent upon the particular peripheral shape of objects P which are being transferred.

As shown in FIGURES 1 and 2, the curved portions 16 cause the objects P to move up or down, or in a sidewise direction. Thus the conveyor 10 moves objects P along almost any desired path of travel, including in a straight line, upwardly, downwardly, or sidewardly.

An important feature of the invention is that surrounding each of the shafts 12 are rotatable spiral members 18. Since the spirals 18 rotate, these members actually move the planar objects P along the pre-determined path of travel, in accordance with the particular layout of the shafts 12. Specifically, as shown in FIGURE 6, the planar objects P are adapted to be supported in a generally endwise position on the shafts 12 and the opposed surfaces of the objects P are located between adjacent loops 19 of the spirals 18, whereby the objects P are moved along the shafts 12 upon rotation of the spiral members 18. Although, the objects P are shown in the drawings in a substantially vertical position, they may be conveyed at an angle to the shaft 12, such as 45°. When painted or coated objects P are being conveyed, there is only minimal or substantially point-to-point contact between a portion of the loop 19 and only an edge of the object P, whereby there will be little if any smearing of the coated or painted surface.

Referring to FIGURES 1-3, the entrance end 20 of the conveyor system 10 is curved in a downward direction in order that planar objects P may be automatically loaded on the conveyor 10, such loading being more easily accomplished at an angle than is a more vertical position.

As shown best in FIGURE 3, at the entrance end 20, a support frame 21 carries the ends of each of the shafts 12. The frame 21 includes a back plate 22, a front plate 24, and a pair of spacers 26 for separating the back plate 22 from the front plate 24. Mounted on the outer side of the front plate 24 are flanges 28. The flanges 28 fixedly secure the curved portions 16 of the shafts 12 to the support frame 21. Bearing members 30 are mounted on the inner side of the front plate 24, both the bearing members 30 and the flanges 28 being secured to the plate 24 by screws 32. Surrounding the flanges 28 are sprockets 34 which are rotatably mounted thereto by ball bearings 36 and ring bearings 38. C-clamps 40 are secured to the ends of the flanges 28 so as to securely maintain the ring bearings 38, sprockets 34, and ball bearings 36 in place on the flanges 28.

Mounted on the rear side of the back plate 22 by screws 44 are end bearing members 42, which rotatably carry drive rods 46. Since curved portions 16 of the shafts 12 clearly do not rotate, these remain in a fixed position and the straight portions 14 rotate. In order to rotate the straight portions 14, means are provided for transferring the rotation of the sprockets 48 thereto and include the drive rods 46, intermediate drive rods 52, and end drive rods 54. The drive rods are secured together by universal joints 56, whereby upon rotation of the sprockets 48, which are secured to the rods 46 by set screws 50, all of the drive rods are rotated within and relative to the fixed hollow curved portions 14.

At the junctures 58 of the curved portions 16 and straight portions 14, sleeves 60 are secured within the hollow curved portions 16 by set screws 62. Each of sleeves 60 in turn securely carries a journal bearing 64. The journal bearing 64 rotatably carries the end drive rod 54. By means of the key 68, the rotation of the end drive rod 54 is transferred to a sleeve 70, which being secured within the straight portion 14 of the shaft 12 by a set screw 72, also causes rotation of the straight portions 14.

Since the spiral members 18 are rotatable, they are secured, as by welding, to the sprocket 34 and are also secured at various intervals, to the straight portions 14 of the shafts 12, by spokes 74, as shown in FIGURES 4 and 5. The spokes 74 are secured, as by welding or brazing to the inner periphery of the spirals 18 and to the outer periphery of the straight portions 14. Thus, rotation is imparted to the spiral members 18 by attachment to the sprockets 34 and also by attachment to the rotating straight portions 14 through the spokes 74. There is, of course, no attachment between the rotating spiral members 18 and the fixed curved portions 16. However, in order to properly space the spirals 18 from the curved portions 16, helical discs 76 are secured at intervals along the inner periphery of the spiral 18, as by welding, so as to freely rotate upon the curved portions 16. The spacer discs 76 are best shown in FIGURES 10-12.

Since the straight portions 14 of the shafts 12 may extend for a long distance, means are provided to support the shafts 12 at suitable intervals. One such supporting means, located wherever required along the conveyor, is illustrated in FIGURES 6 and 7 and includes rollers 78 for supporting the straight portions 14 along the outer periphery of the spirals 18. As the spirals 18 are rigidly spaced from the straight portions 14 by the spokes 74, both the spirals 18 and the straight portions 14 are properly supported by the sets of roller supports 78. The upper rollers 78 are rotatably carried by the upright end supports 80, which are mounted on the supporting frame 82. As seen in FIGURE 7, the rollers 78 for the lower set of shafts 12 are rotatably carried directly by the cross support 84 of the frame 82.

An alternate method for supporting elongated sections of the straight portions 14 is shown in FIGURES 13 and 14. In this embodiment, the straight portions themselves are rotatably carried by bearing supports 86 located at various intervals along the conveyor. The bearing supports 86 are supported by a support arm 88 which includes a horizontal portion 90 which passes between the last loop 19 of a broken spiral 18 and the shafts 12 and then passes exterior to the first loop 19 of the adjacent spiral 18 so as to allow continued rotation of the spirals 18. Although in this embodiment, the spirals 18 are not continuous, it should be clearly understood that this has no effect upon the continuous transference of the objects along the conveyor.

Referring particularly to FIGURES 8 and 9, at the exit end 92 of the conveyor 10, an end support 94 for the straight portions 14 is provided. The end support 94 includes a base member 96 which carries upright members 86 which are adapted to rotatably carry the end of the rotating shafts 12. Shaft supporting rings 100 are secured to each of the uprights 98, as by welding, and provide support for the stub shafts 102 which project into the shafts 12. The ends of the shafts 12 carry journal bearings 104 so as to provide relative rotation between the stub shafts 102 and the rotating shafts 12. By providing an exit 92 which is substantially horizontal, the objects P being discharged are readily collected.

Thus, from the foregoing description of the conveyor, it is seen that all of the foregoing objects have been accomplished. Planar objects are carried by the conveyor 10 in a substantially endwise position while moving along almost any desired path of travel, including upwardly, downwardly, sidewardly, and in a straight path. The plurality of spiral members 18 cooperate in maintaining the planar objects P in the substantially endwise position in order to avoid smearing of painted or coated surfaces while the objects are being transferred. Any contact between the spirals 18 and the planar objects P is limited to substantially a point to point contact whereby undesirable smearing of the objects is avoided. Further, the conveyor itself does not continually move through heating or cooling zones, thereby avoiding the undesired heating or cooling losses. Thus, it is seen that a highly flexible and simply constructed conveyor system is provided for transferring painted or coated planar objects, without smearing, along almost any desired path of travel.

While in the foregoing there has been a detailed description of a particular embodiment of the present invention, it is to be understood that all equivalents obvious to those having skill in the art are to be included within the scope of the invention, as claimed.

What I claim and desire to secure by Letters Patent is:

1. An improved conveyor system for transferring objects along a predetermined path of travel, said conveyor system comprising a plurality of spaced, substantially continuous shafts, each of said shafts having both curved portions and substantially straight portions, said curved portions remaining in a fixed position, means for rotating said straight portions, spiral members mounted around each of said shafts and being rotatable with said straight portions, the rotation of said spirals causing longitudinal movement of said objects along the shafts, means connecting said spiral members to said straight portions for rotation therewith, means for maintaining the helices of said spiral members spaced from the fixed curved portions of said shafts, and said spiral members being constructed to rotate relative to said fixed curved portions so that objects may be readily moved around said fixed curved portions.

2. The conveyor system of claim 1 wherein driving means are provided for rotating both the straight portions of said shafts and said spiral members together.

3. The conveyor system of claim 1 wherein said curved portions are hollow, and portions of said rotating means pass through said hollow curved portions for interconnecting said rotating means to the straight portions while maintaining said curved portions in a fixed position.

4. An improved conveyor system for transferring substantially planar objects along a path of travel, said conveyor system comprising a plurality of spaced, substantially continuous shafts, each of said shafts having both curved portions and substantially straight portions, said curved portions remaining in a fixed position, means for rotating said straight portions, and spiral members mounted around and being spaced from each of said shafts and being rotatable with said straight portions and being freely movable about said curved portions, said spiral members including adjacent loops which receive edge portions of said planar objects therebetween and cooperate to maintain said objects in a substantially upright position on said shafts, the number of loops at each curved portion of each of said shafts being substantially equal regardless of the radius of curvature or length of said curved portions so that said objects remain in a substantially upright position while moving about said curved portions.

5. An improved conveyor system for transferring planar objects along a predetermined path of travel, said conveyor system comprising a plurality of spaced, substantially continuous shafts, each of said shafts having both curved portions and substantially straight portions, said curved portions remaining in a fixed position, means for rotating said straight portions, continuous spiral members mounted around each of said shafts, and means for intermittently connecting and securing said spiral members in spaced relationship to said straight portions whereby said spiral members and said straight portions are rotatable together, each of said spiral members having adjacent loops for receiving edge portions of said planar objects therebetween and cooperating to maintain said planar objects in a substantially upright position on said shafts and to thereby advance said planar objects along said path of travel, said spiral members being freely movable with respect to said curved portions and being spaced therefrom, whereby said planar objects are moved along said path of travel in a substantially upright position at both the curved portions and the straight portions.

6. The conveyor system of claim 5 wherein the number of said loops at each curved portion of each of said shafts is substantially equal regardless of the radius of curvature of each of said curved portions, whereby said objects are properly moved around said curved portions.

References Cited by the Examiner
UNITED STATES PATENTS

| | | | |
|---|---|---|---|
| 1,826,853 | 10/31 | Williams | 198—213 |
| 2,869,715 | 1/59 | Williams | 198—64 |
| 2,906,238 | 9/59 | Heaton | 198—213 |

FOREIGN PATENTS

| | | |
|---|---|---|
| 606,590 | 10/60 | Canada. |
| 232,403 | 4/25 | Great Britain. |

SAMUEL F. COLEMAN, *Primary Examiner.*

ERNEST A. FALLER, JR., *Examiner.*